(12) United States Patent
Fåhraeus et al.

(10) Patent No.: US 6,698,660 B2
(45) Date of Patent: Mar. 2, 2004

(54) ELECTRONIC RECORDING AND COMMUNICATION OF INFORMATION

(75) Inventors: Christer Fåhraeus, Lund (SE); Linus Wiebe, Lund (SE); Marianne Lindström, Stockholm (SE)

(73) Assignee: ANOTO AB, Lund (SE)

( * ) Notice: Subject to any disclaimer, the term of this patent is extended or adjusted under 35 U.S.C. 154(b) by 31 days.

(21) Appl. No.: 09/885,530

(22) Filed: Jun. 21, 2001

(65) Prior Publication Data

US 2002/0033414 A1 Mar. 21, 2002

Related U.S. Application Data

(60) Provisional application No. 60/261,922, filed on Jan. 16, 2001.

(30) Foreign Application Priority Data

Sep. 7, 2000 (SE) ................................. 0003195

(51) Int. Cl.⁷ .............................. G06K 7/10; G09G 5/00
(52) U.S. Cl. .................... 235/472.01; 345/179
(58) Field of Search ................................ 235/375, 380, 235/462.15, 462.49, 472.03, 472.01; 345/179

(56) References Cited

U.S. PATENT DOCUMENTS

| | | | |
|---|---|---|---|
| 5,483,052 A | 1/1996 | Smith, III et al. | 235/472 |
| 5,652,412 A | 7/1997 | Lazzouni et al. | 178/18 |
| 5,932,863 A | 8/1999 | Rathus et al. | 235/462.15 |
| 6,050,490 A | 4/2000 | Leichner et al. | 235/462.49 |

FOREIGN PATENT DOCUMENTS

| | | |
|---|---|---|
| DE | 4436700 C1 | 2/1996 |
| EP | 0615209 A2 | 9/1994 |
| GB | 2268442 A | 1/1994 |
| WO | 99/46909 | 9/1999 |
| WO | 99/50787 | 10/1999 |
| WO | 00/72244 A1 | 11/2000 |
| WO | WO 01/16691 A1 | 3/2001 |
| WO | WO 01 26032 A1 | 4/2001 |
| WO | WO 01/26033 A1 | 4/2001 |
| WO | 01/48590 A1 | 7/2001 |
| WO | WO 01/48591 A1 | 7/2001 |
| WO | WO 01/48678 A1 | 7/2001 |
| WO | WO 01/48685 A1 | 7/2001 |
| WO | 01/61449 A2 | 8/2001 |

*Primary Examiner*—Thien M. Le
*Assistant Examiner*—April Nowlin
(74) *Attorney, Agent, or Firm*—Birch, Stewart, Kolasch & Birch, LLP

(57) ABSTRACT

In a method of recording and managing information, information is written on a product using a handheld writing device, the handwritten information being recorded electronically and at least partly communicated in a communication network. Moreover, the user writes by means of the writing device a command which is recorded electronically and which qualifies the managing of the electronically recorded information in the communication network.

A system for information management, a server unit in such a system, a computer program for information management and a product are also described.

31 Claims, 2 Drawing Sheets

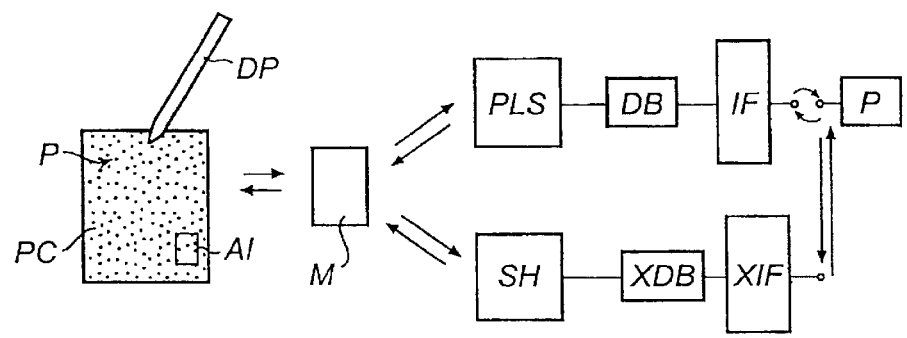
Fig. 1
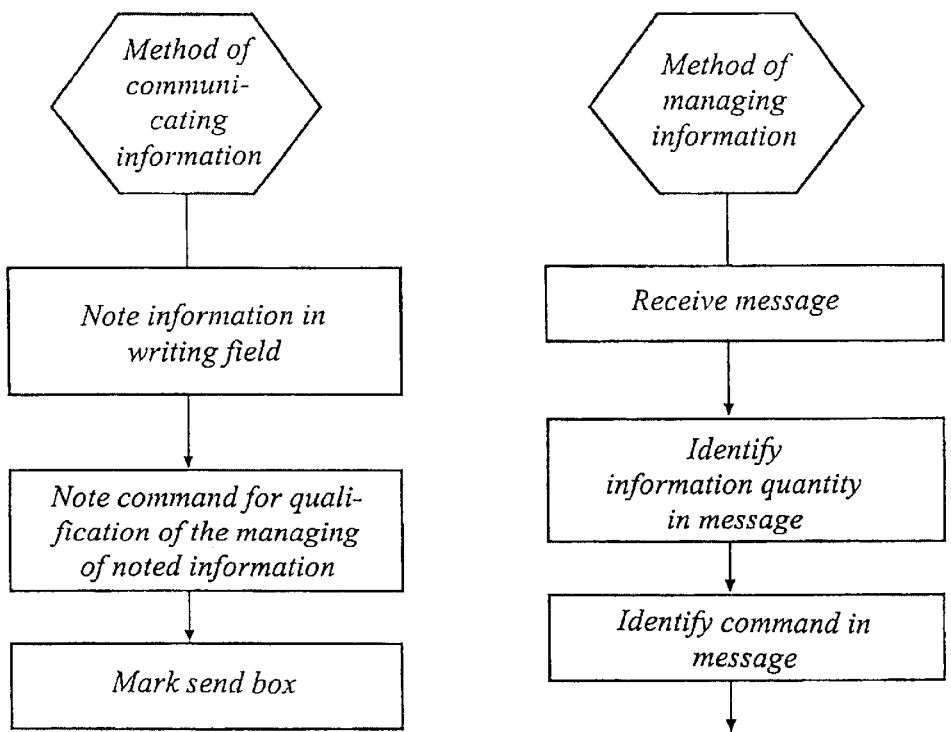
Fig. 2
Fig. 4

US 6,698,660 B2

ELECTRONIC RECORDING AND COMMUNICATION OF INFORMATION

This application claims the benefit of No. 60/261,922 filed Jan. 16, 2001.

FIELD OF THE INVENTION

The present invention relates generally to electronic recording and communication of information.

BACKGROUND ART

A large number of handheld appliances for inputting of information into computers, PDAs, mobile phones and the like have been developed. Examples of such appliances are reading pens for inputting of text and electronic writing/pointing devices for electronic recording of handwritten information by position determination. There are a great variety of techniques for accomplishing position determination in electronic writing devices, such as via accelerometers, gyros or mechanical movement detectors integrated into the writing device, via triangulation of signals from transceivers which are arranged in the surroundings of the writing device and intended for laser light, sound waves, radio waves or IR radiation, via interaction with pressure-sensitive writing tablets/displays, via interaction with an electromagnetic field generated by a writing base, etc.

Patent Publication WO 01/16691, which is assigned to the Applicant and which is hereby incorporated by reference, discloses a technique for increasing the functionality of electronic writing devices in addition to pure inputting of information into a computer or the like. To this end, a position code is used, which codes a plurality of positions in a writing field of a product, along with a writing device which is designed to detect the position code, in order to electronically record information which is noted down in the writing field. The product also has at least one activation icon which, when detected by the writing device, causes the writing device to initiate a predetermined operation while using the recorded information. More specifically, the position-coded product has a built-in functionality, in that different positions on the product, such as positions in the activation icon and positions in the writing field, are dedicated to different functions. The position code is also capable of coding absolute coordinates for a large number of positions, much larger than the number of necessary positions on the product. Thus, the position code can be considered to make up a virtual surface which is defined by all positions which the position code is capable of coding, different positions on the virtual surface being dedicated to different functions and/or operators.

The combination of writing device and position-coded product can, like in the prior-art techniques stated above, be used as an inputting device for a computer, a PDA, a mobile phone etc. For instance, handwritten text and sketches noted down on a notebook page can be transferred via the writing device to a computer. The combination of writing device and position-coded product, can, however, also be used for e-commerce, if the writing device communicates with a communication network, such as the Internet, a telephone network, etc. For instance, the writing device can be used to order a product or service from a position-coded advertisement in a magazine, by the positions in the advertisement being dedicated to such a functionality. Correspondingly, global communication is made possible, direct from an appropriately position-coded product via the writing device.

The information recorded by the writing device can, for instance, be converted into a fax message, an e-mail message or an SMS, and then be sent from the writing device to a recipient via the communication network.

In the above cases, the user has a product, for instance a notebook or a scratch pad, which is provided with preprinted graphics and a position code, typically a position-coded writing field for inputting of graphical information, a position-coded address field for inputting of address information, a position-coded subject field for inputting of a heading, and position-coded multiple choice fields for choosing the communication method (fax, e-mail, SMS).

As this type of product is being established on the market, new services will be developed, and existing services will be refined, for instance by different options being added for the management of the recorded information. This means that also new products must be printed, which are adapted to the developed or refined services. This in turn places great demands on manufacture and distribution of products, in order to ensure that the latest version of the product is available on the market. Moreover, the rejection of old versions of a product can be considerable, with the ensuing costs. It may also be difficult for the user, and associated with costs, always to have access to the latest version of a certain product.

SUMMARY OF THE INVENTION

An object of the present invention thus is to provide a method which overcomes the above problems.

These and other objects that will be evident from the following description are now achieved wholly or partly by a method according to claim 1, a system according to claim 17, a computer unit according to claim 27, and a computer program according claim 31. Preferred embodiments are defined in the appended claims.

Thus, the invention enables inputting of a command which qualifies the management of the electronically recorded information in the communication network. The command can be seen as a refining command. The user may use existing products which are dedicated to a certain service, but still have access to further developments of this service. Thus the user will have quick access to further developed services, in practice as soon as they are introduced in the communication network. The service provider has the advantage of being capable of further developing his services and still retain the products distributed on the market. It will also be possible to test the market's receptivity to a further development without costs for manufacturing and distributing new products, for instance position-coded sheets of paper with a new graphic layout. The invention also allows the user to use generic products and control the choice of service by entering a desired command.

BRIEF DESCRIPTION OF THE DRAWINGS

The invention will now be described by way of example with reference to the accompanying drawings, which schematically illustrate currently preferred embodiments and in which FIG. 1 shows an embodiment of a system in which the invention can be accomplished, FIG. 2 illustrates steps that can be carried out in a method of communicating information according to an embodiment of the invention, FIG. 4 illustrates method steps that can be carried out in the system in FIG. 1 when information is communicated therein.

DESCRIPTION OF PREFERRED EMBODIMENTS

Figure 3A:
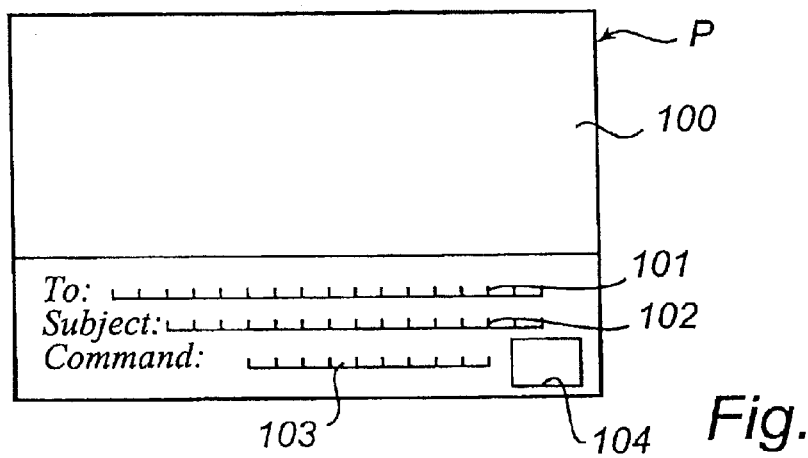
FIGS. 3*a*–3*c* show three different embodiments of the product for use in communication of information according to the method in FIG. 2.

FIG. 1 shows a system in which the invention can be accomplished. The system, and alternatives thereto, is described in Applicant's International Patent Applications PCT/SE00/02640, PCT/SE00/02641 and PCT/SE00/02659 which are incorporated herein by reference. The system in FIG. 1 comprises a plurality of writing devices or digital pens DP, a plurality of products P with a position code PC, a look-up unit PLS and at least one service-providing unit SH.

The digital pens DP are designed to record the position code PC locally on the product P and convert the recorded position code PC into a position of the pen DP on the product P. At the same time as the user writes with the pen DP on the product P, an electronic recording of a corresponding sequence of positions thus takes place. The position code PC and the digital pen DP are described in detail in Applicant's Patent Publications WO 01/26032 and WO 01/26033 which are hereby incorporated by reference.

As mentioned by way of introduction, when discussing WO 01/16691, use is made of a position code PC which is capable of coding absolute coordinates for a very large number of positions, which make up a virtual surface and which are dedicated to different functions and/or operators. Only a subset of these positions is coded on the product P.

The look-up unit PLS is a server unit having access to a database DB which contains information about the virtual surface, for instance a connection between different positions on the virtual surface and addresses of different service-providing units SH.

The service-providing unit SH is a server unit which executes a service, such as storing or forwarding digital information or initiating transfer of a product or information, for instance in the form of a fax, an e-mail message or an SMS, to a recipient.

A user connected to the system can by means of the writing device DP note information on the position-coded product P and then mark the activation icon AI. When the pen DP records the activation icon AI, it is caused to send a message to the look-up unit PLS, which message contains at least one position from the electronic information that has been recorded on the product P. In the example shown, wireless transmission is performed from the pen DP to a network connecting unit M, such as a mobile phone, a computer or a PDA, which communicates with the look-up unit PLS in a communication network. Alternatively, the network connecting unit M can be incorporated into the pen DP.

When the look-up unit PLS receives the message from the pen DP, a look-up in the database DB is performed. Based on the position contents of the message, the look-up unit PLS then instructs the pen DP to communicate with a specific service-providing unit SH in the communication network, for instance by returning a network address (url) to the pen DP. Then the pen DP sends, via the network connecting unit M, the electronically recorded information to the appointed service-providing unit SH.

The service-providing unit SH is conveniently connected to a database XDB which contains data regarding the functionality of each position on the product P. The service-providing unit SH then processes the received information in dependence on its position contents.

The service-providing unit SH is administered by a service provider, which can be a network operator which provides electronic message services, a calendar producer which offers electronic calendar handling, a data storing company which offers data storage in the communication network, etc. Each service provider has, as a rule, produced his own position-coded products P with predefined graphic fields and an associated position code PC with the desired functionality. According to the invention, however, the user can qualify the management of the information in the communication network in addition to the possibilities that are indicated on the product P.

FIG. 2 illustrates steps which according to the invention can be carried out by the user when communicating information in the system in FIG. 1. These steps will be illustrated in more detail in connection with the following description of three different embodiments of the product included in the system, with reference to FIGS. 3a–3c.

The product in FIG. 3a contains a writing field 100 for noting graphic information, an address field 101 for entering a receiving address, such as a telephone number, a fax number or an e-mail address, a subject field 102 for entering a heading, a command field 103 for entering a command, and an activation icon in the form of a send box 104. The address field 101, the subject field 102 and the command field 103 code positions which are dedicated to initiation of an OCR interpretation (Optical Character Recognition) of the associated information. This OCR interpretation can take place in the pen DP, in the look-up unit PLS or in the service-providing unit SH.

The user can, by noting a command in the command field 103, refine the management of the information noted on the product, generally in the writing field 100. The command is suitably a sequence of characters which in plain text identifies the corresponding operation, for instance INTERPRET (causes an ICR interpretation [Intelligent Character Recognition] of the information in the writing field 100), TRANSLATE (causes an ICR interpretation and translation of the information in the writing field 100), STORE (causes the information in the writing field 100 to be saved in a storage location), FORMAT (causes the information in the writing field 100 to be formatted according to a given pattern), BACKGROUND (causes the information in the writing field 100 to be presented against a background image).

The user may add additional definitions to the main command name, via a suitable separator, for instance "/",and thus build a composite command, such as FORMAT/ POWERPOINT, TRANSLATE/ENGLISH or BACKGROUND/ALPS. Other composite commands can relate to indication of a mode of payment for the service in question, such as PAY/VISA (payment withdrawn from a predefined account), PAY/VISA/1234123412341234 (payment withdrawn from the indicated account number), PAY/TELE (cost invoiced by the operator administering the management of the user's information in the communication network).

By the command being recorded on a given part of the virtual surface, it can be distinguished from the other information in the message that is sent to the service-providing unit SH, which translates the command into an operation that is executed on the information recorded in the writing field 100, which information can also be identified on the basis of its position contents.

Figure 3B:
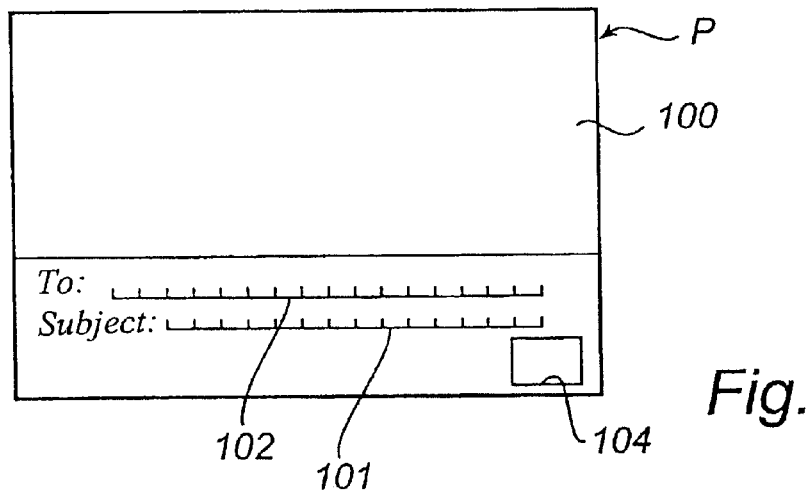

The product in FIG. 3b has no dedicated command field. Instead the system is designed to detect the existence of a command on the basis of a given symbol, for instance ⟨symbol⟩, and the subsequent or preceding character identifies the meaning of the command. The symbol is suitably of a type that is easy to note, easy to interpret and unique in the sense that it does not appear in any written language.

The user can also note the command in the address field 101 or the subject field 102, optionally beside an address and a heading, respectively.

Figure 3C:
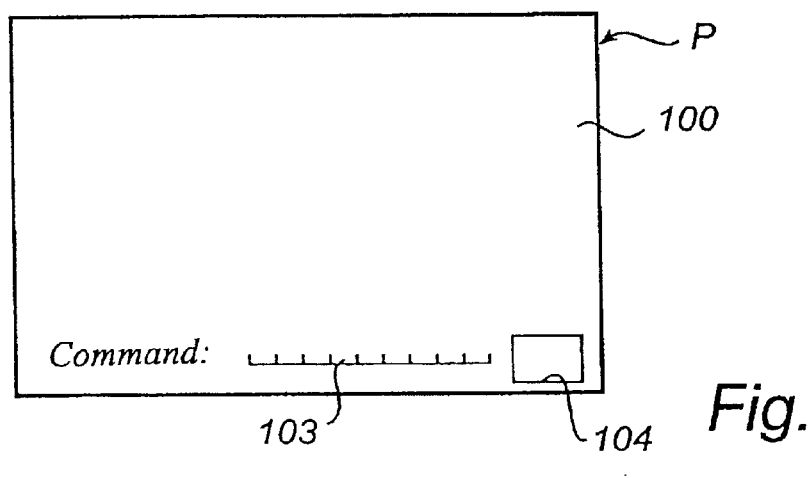

The product in FIG. 3c is quite general in the sense that it allows access to many different services, based on commands that are written in a dedicated command field 103 on the product P.

Thus the user can note information in the writing field 100 and then write a composite command, which contains identification of the selected service, and any supplementary information, such as FAX/08-100100 (the information in the writing field 100 will be sent to the indicated fax number), STORE/CALENDAR (the information in the writing field 100 will be stored in a calendar application of the service provider), or SMS/0733-100100/ATTACHMENT/ALPS (the information in the writing field 100 will be sent as an SMS to the indicated telephone number and presented with an information object showing an alpine landscape).

FIG. 4 illustrates schematically steps that are carried out in the system in FIG. 1 in the management of information, independently of the design of the product P. A message is received by the service-providing unit SH, which identifies a relevant information quantity therein and also searches for a command in the message. If a command is found, the information quantity is qualified correspondingly. In the above example, the translation of the command into an operation takes place in the service-providing unit SH. However, it should be emphasized that this translation can alternatively take place in the look-up unit PLS or even in the pen DP, which either themselves execute the operation or forward a corresponding instruction to the service-providing unit SH.

The identification of commands and the translation thereof into operations are conveniently accomplished in the form of software which is executed in a computer/server. The person skilled in the art can, based on the above description, design such software. For certain types of commands, the identification of commands, and optionally also the translation thereof into operations, can alternatively take place manually.

The administration of available commands takes place suitably centrally, for instance in connection with the look-up unit PLS. As is evident from FIG. 1, the system may comprise a portal P having access to an interface IF to the database DB of the look-up unit PLS, which database may contain a list of available commands. Thus the user can inform himself about these, for instance via the Internet. Alternatively, or besides, the portal P can have access to an interface XIF to the database XDB of the service provider, if the service provider administers the available commands.

It should be pointed out that the scope of the patent protection solicited is not restricted by the above embodiments. The invention may be varied and modified in several ways within the scope of the appended claims.

For instance, the invention is not limited to use of an absolute position code, or to a relative position code. The above discussion can be transferred to an embodiment in which the digital equivalence to a product is identified in an optional fashion, for instance by entering/reading a product ID on the product, and information is recorded electronically by means of a writing device in the form of relative positions on the product. The position determination in such a writing device can take place in an optional fashion, for instance based on one of the techniques stated by way of introduction.

It should also be pointed out that the existence of a command can be identified by a command symbol also when the product has a dedicated command field.

What we claim and desire to secure by Letters Patent is:

1. A method of recording and managing information, comprising the steps of:

writing said information on a product that is dedicated to at least one predefined service, using a handheld writing device, said service being defined by a set of predetermined processing instructions to be executed on said information by a receiving station;

recording said information electronically; writing on the product, using the writing device, a refining command;

recording the refining command electronically; and communicating a data quantity to the receiving station, said data quantity representing at least part of said information and the refining command, wherein the refining command is interpreted to further qualify the predefined service by modifying said set of processing instructions in the receiving station.

2. A method as claimed in claim 1, wherein said information and the refining command are recorded electronically by the writing device.

3. A method as claimed in claim 1, wherein the step of writing the refining command includes writing a symbol that signals the existence of the refining command.

4. A method as claimed in claim 1, wherein the step of writing refining command includes writing a string of characters, to define the refining command.

5. A method as claimed in claim 4, wherein the refining command is written as a sequence of command words, and wherein each subsequent command word in said sequence qualifies a preceding command word.

6. A method as claimed in claim 1, wherein the step of recording said information electronically includes detecting a position code on the product and converting said position code to one or more sequences of positions by means of the writing device.

7. A method as claimed in claim 1, wherein the refining command initiates formatting of at least part of said information.

8. A method as claimed in claim 1, wherein the refining command initiates a translation of at least part of said information.

9. A method as claimed in claim 1, wherein the refining command initiates a character interpretation of at least part of said information.

10. A method as claimed in claim 1, wherein the step of recording the refining command electronically includes detecting a position code on the product and converting said position code to one or more sequences of positions by means of the writing device.

11. A method as claimed in claim 1, wherein the refining command initiates an information object to be associated with at least part of said information.

12. A method as claimed in claim 1, wherein the refining command identifies a payment service.

13. A method as claimed in claim 1, wherein the step of recording the refining command electronically includes detecting a position code on the product and converting said position code to one or more sequences of positions by means of the writing device.

14. A method as claimed in claim 6 or 13, wherein said at least one service is identified based on the position code on the product.

15. A method as claimed in claim 13, wherein the refining command is written in a position-coded field which is dedicated to character interpretation of information noted therein.

16. A method as claimed in claim 13, wherein the refining command is written in a position-coded field which is dedicated to commands.

17. A system for information management, comprising:
   a product that is dedicated to at least one predefined service; and
   a writing device which electronically records handwritten information on the product and communicates at least part thereof to a receiving station which executes a set of predetermined processing instructions on the handwritten information,
   wherein the product has a field which enables electronic recording of a refining command by means of said writing device, said system interpreting said refining command to further which qualify said at least one service by modifying said set of processing instructions in the receiving station.

18. A system as claimed in claim 17, wherein the writing device is designed for simultaneous writing and electronic recording of the refining command.

19. A system as claimed in claim 17, wherein the product is provided with a position code which codes at least one position, and wherein the writing device is designed to record the handwritten information by detection of said position code.

20. A system as claimed in claim 17, wherein said field is provided with a position code which codes at least one position, and wherein the writing device is designed to record the refining command by detection of said position code.

21. A system as claimed in claims 17, wherein said field is dedicated to character interpretation of information noted therein.

22. A system as claimed in claim 17, wherein said field is dedicated to commands.

23. A system as claimed in claim 17, wherein the receiving station interprets and executes the refining command.

24. A system as claimed in claim 23, wherein the product is provided with a position code which codes at least one position, wherein the writing device is designed to record the handwritten information by detection of said position code, and wherein the receiving station identifies said at least one service based at least one position in the handwritten information.

25. A system as claimed in claim 17, which identifies the existence of a refining command on the basis of a symbol included therein.

26. A system as claimed in claim 17, which identifies the meaning of a refining command on the basis of a character string included therein.

27. A computer unit which is adapted to be included in a system for managing electronic information, which computer unit is adapted to:
   receive a plurality of position indications,
   identify among said position indications an information quantity which represents handwritten information,
   identify, based on at least one of said position indications, a predetermined set of processing instructions to be executed on said information quantity,
   scan said position indications for identification of a refining command, and, when identifying said the refining command, modify said set of processing instructions on the basis of the refining command.

28. A computer unit as claimed in claim 27, which is designed to search, during said scanning, for given positions among said position indications.

29. A computer unit as claimed in claim 27, which is designed to search, during said scanning, for a predetermined symbol.

30. A computer unit as claimed in claim 27, which is designed to identify, during said scanning, a character string, and to form the refining command from said character string.

31. A computer program for information management, which is stored on a computer-readable memory medium and which comprises instructions for causing a computer to:
   receive a plurality of position indications,
   identify among said position indications an information quantity which represents handwritten information,
   identify, based on at least one of said position indications, a predetermined set of processing instructions to be executed on said information quantity,
   scan said position indications for identification of a refining command, and
   when identifying the refining command, modify said set of processing instructions on the basis of the refining command.

* * * * *

UNITED STATES PATENT AND TRADEMARK OFFICE
CERTIFICATE OF CORRECTION

| | |
|---|---|
| PATENT NO. | : 6,698,660 B2 |
| DATED | : March 2, 2004 |
| INVENTOR(S) | : Christer Fåhraeus, Linus Wiebe and Marianne Lindström |

It is certified that error appears in the above-identified patent and that said Letters Patent is hereby corrected as shown below:

Claims 1, 10, 17, 24 and 27 should read as follows:

Column 6,
Line 9, -- 1. A method of recording and managing information, comprising the steps of:

writing said information on a product that is dedicated to at least one predefined service, using a handheld writing device, said service being defined by a set of predetermined processing instructions to be executed on said information by a receiving station;
recording said information electronically;
writing on the product, using the writing device, a refining command;
recording the refining command electronically; and
communicating a data quantity to the receiving station, said data quantity representing at least part of said information and the refining command,
wherein the refining command is interpreted to further qualify the predefined service by modifying said set of processing instructions in the receiving station. --
Line 53, -- 10. A method as claimed in claim 1, wherein the refining command initiates storage of at least part of said information. --

Column 7,
Line 11, -- 17. A system for information management, comprising:
a product that is dedicated to at least one predefined service; and
a writing device which electronically records handwritten information on the product and communicates at least part thereof to a receiving station which executes a set of predetermined processing instructions on the handwritten information,
Wherein the product has a field which enables electronic recording of a refining command by means of said writing device, said system interpreting said refining command to further qualify said at least one service by modifying said set of processing instructions in the receiving station. --
Line 46, -- 24. A system as claimed in claim 23, wherein the product is provided with a position code which codes at least one position, wherein the writing device is designed to record the handwritten information by detection of said position code, and wherein the receiving station identifies said at least one service based on at least one position in the handwritten information. --

UNITED STATES PATENT AND TRADEMARK OFFICE
CERTIFICATE OF CORRECTION

PATENT NO. : 6,698,660 B2
DATED : March 2, 2004
INVENTOR(S) : Christer Fåhraeus, Linus Wiebe and Marianne Lindström It is certified that error appears in the above-identified patent and that said Letters Patent is hereby corrected as shown below:

<u>Column 8,</u>
Line 10, -- 27. A computer unit which is adapted to be included in a system for managing electronic information, which computer unit is adapted to:
    receive a plurality of position indications,
    identify among said position indications an information quantity which represents handwritten information,
    identify, based on at least one of said position indications, a predetermined set of processing instructions to be executed on said information quantity,
    scan said position indications for identification of a refining command, and, when identifying the refining command, modify said set of processing instructions on the basis of the refining command. --

Signed and Sealed this

Fifth Day of October, 2004

JON W. DUDAS
*Director of the United States Patent and Trademark Office*